Oct. 27, 1931.                D. M. BELCHER                1,829,708
                  CONTROLLING DEVICE FOR POWER OPERATED VALVES
                           Filed Nov. 18, 1927
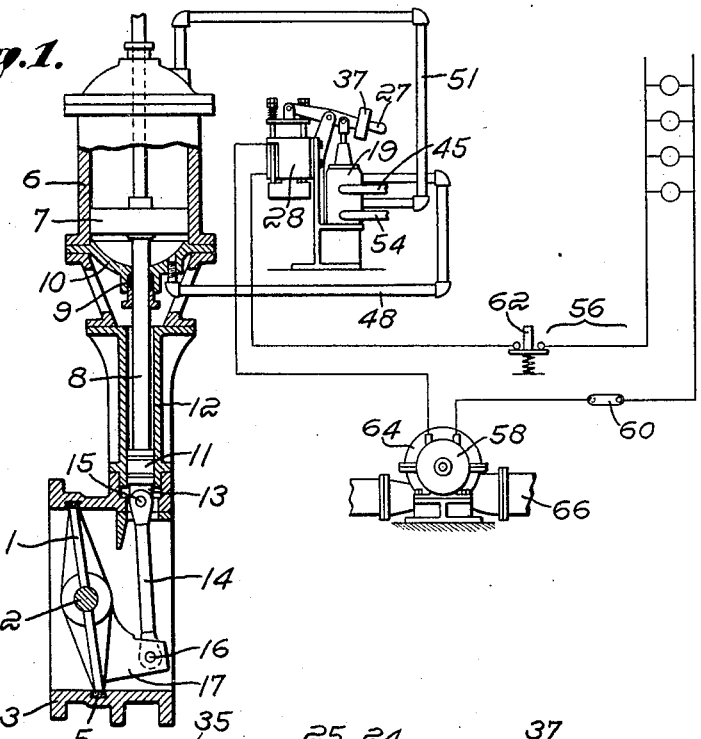
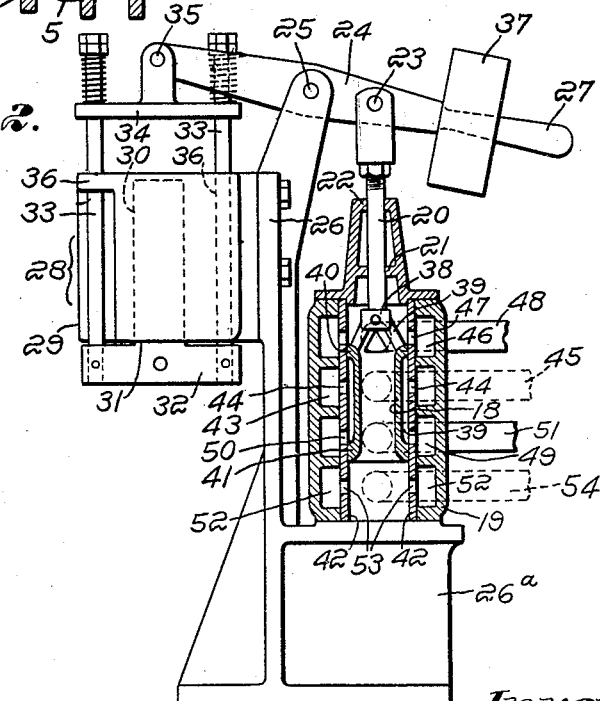
Inventor:
Donald M. Belcher,
By Emery, Booth, Janney & Varney
Attys.

Patented Oct. 27, 1931

1,829,708

UNITED STATES PATENT OFFICE

DONALD M. BELCHER, OF ARLINGTON, MASSACHUSETTS, ASSIGNOR TO COFFIN VALVE COMPANY, OF NEPONSET, MASSACHUSETTS, A CORPORATION OF MAINE

CONTROLLING DEVICE FOR POWER OPERATED VALVES

Application filed November 18, 1927. Serial No. 234,169.

My invention aims to provide an improved controlling device for power operated valves, and in the accompanying drawings is shown an illustrative embodiment of the invention, wherein:

Fig. 1 is a somewhat diagrammatic view of a valve showing a power operating means for the valve together with a controlling device for setting said operating means into operation from near or remote points; and Fig. 2 is a slightly enlarged detail view of the power controlling device.

In the particular embodiment of my invention selected for purposes of illustration and shown in the drawings a valve of the type known to the art as a pivot valve is employed. This valve has a pivoted member 1 mounted upon a shaft 2 journaled within a suitable housing 3. The periphery of the pivoted valve member 1 is suitably ground to seat tightly against a ring 5 embedded within the walls of the housing 3.

The present invention is principally concerned with the operation of large valves which require to be operated by power rather than by hand and in the present example the power operating means employed comprises a power cylinder 6 within which a piston 7 is arranged to reciprocate. A piston rod 8 secured to said piston passes through a stuffing box 9 in the cylinder head 10 and terminates in a cylindrical piston like crosshead 11 which reciprocates in a suitable guide 12 formed in a bracket supported herein by said cylinder head 10. The guide 12 is of cylindrical form and communicates directly with the interior of the valve housing 3 and the cross head 11 fitting tightly in said guide prevents the escape of water from the valve housing. The piston or cross-head 11 carries ears 13 to which a link 14 is pivotally connected at 15. The other end of the link 14 is pivoted at 16 to an arm 17 of the pivot valve 1 whereby any reciprocations of the piston 7 within said cylinder 6 will be imparted to said valve to rock the same upon its pivot 2 so as to open or close said valve according to the direction in which said piston moves.

Any suitable fluid may be employed to operate the piston 7 within its cylinder, as for example water, compressed air or steam, but whatever the power used it is desirable that the control of such power be exercised from both near and remote points. To this end therefore a controlling device, herein a valve 18, of a reciprocating type is arranged to reciprocate in a valve housing 19. The valve 18 has a stem 20 secured to one end thereof which passes outwardly from the housing 19 through guides 21 and 22 and has pivotal connection at 23 with a lever 24. The lever 24 is pivoted at 25 upon a suitable bracket 26 carried by the base 26ª for the housing 19. One end of the lever 24 is provided with a handle 27 whereby said lever 24 may be manually rocked and the valve 18 be reciprocated within the valve housing 19 to control the admission and discharge of power fluid to and from the cylinder 6, as will hereinafter more fully be described.

The handle 27 constitutes a means for manually reciprocating the valve 18 or for operating the means for controlling the valve operating instrumentalities from a point near said valve. The aforesaid remote controlling means herein include a solenoid 28 consisting of a housing 29 within which the usual coils are arranged around a cylindrical passage 30 through which a solenoid core 31 is adapted to reciprocate. The housing 29 is supported upon the bracket 26 in proximity to the end of the lever 24 opposite said handle 27.

The solenoid core 31 is carried by a crosshead 32 suspended by rods 33 from a yoke 34, the latter being pivotally connected at 35 with said lever 24. The rods 33 reciprocate in guides 36 in the housing 29 and are yieldingly connected with said yoke 34.

Energization of said solenoid coils will cause said core 31 to descend thereby yieldingly depressing the end of the lever 24 to which the yoke 34 is attached and raising the valve 18. As long as the coils of the solenoid 28 remain energized by the electric current passing therethrough said valve 18 will be held in its raised position, but the moment said current is cut off for any reason, the said valve 18 will drop, due to the fact that its weight together with the combined weights of the handle 27 and counter weight 37 carried by said handle will outweigh the opposing weights, namely those of the solenoid core 31, yoke 32, rods 33 and yoke 34, thus causing the piston to return to its normal position.

The valve 18 is desirably hollow from end to end and carries the boss 38 to which is secured the rod 20. The boss is supported at one end of said valve by a series of substantially radial arms. In the outer periphery of the member 18 is an annular groove 39 which terminates at annular bearing surfaces 40 and 41 arranged at opposite ends respectively of the sleeve member 18 and slidably engaging a bushing 42, herein fixed within said housing 19.

The valve casing or housing 19 is provided with an annular chamber 43 surrounding the fixed sleeve or bushing 42 and having communication with the interior of said bushing through one or more ports 44. The chamber 43 is in the present example a pressure chamber to which pressure fluid is supplied through an intake pipe 45. Also within the housing 19 and in close proximity to although separated from the annular chamber 43 is a second annular chamber 46 likewise having communication with the interior of the bushing 42 through one or more ports 47. A pipe 48 provides communication between said annular chamber 46 and one end, herein the lower end of the cylinder 6. A third annular chamber 49 is arranged in the valve housing 19 adjacent to but separated from the annular intake chamber 43, and this chamber has communication through one or more ports 50 with the interior of said bushing 42. A pipe 51 provides communication between said annular chamber 49 and the upper end of the cylinder 6 (see Fig. 1). A fourth annular chamber 52 is arranged in the valve housing 19 surrounding said fixed bushing 42 and has communication through one or more ports 53 with the interior of said bushing, and from this last mentioned annular chamber leads an exhaust pipe 54 to any desired point of discharge.

The annular bearing surfaces 40 and 41 of the reciprocating valve are so arranged that upon the reciprocation of said valve cooperation is effected between the various ports in said bushing whereby fluid may be admitted to said cylinder 6 at one side of the piston 7, while the opposite end of said cylinder from that to which fluid is admitted, is opened to effect discharge of whatever fluid remains therein, thus providing means for moving the piston 7 in either direction at will.

To be more specific, assume for example that the pivot valve 1 is closed and all parts are positioned as shown in the drawings. To open said valve 1 the sleeve valve 18 must be raised to connect the supply pipe 45 with the lower end of the cylinder 6. This may be accomplished in two ways, one way being to raise the handle 29 manually, which can be done only from a point near the valve, or said valve may be raised by closing an electric circuit containing the solenoid 28 whereby the core 31 of said solenoid will be drawn down and the handle 29 of the lever together with said sleeve valve 18 attached to said lever will be raised.

The raising of said sleeve valve by either of the aforesaid means effects communication between the supply chamber 43 and the chamber 46 connected as hereinbefore stated by the pipe 48 with the lower end of the cylinder 6, and admitting power fluid beneath the piston 7 so as to raise the latter and open said valve 1. As said sleeve valve 18 moves upward in the housing 19 its lower end will be carried above the ports 50, thereby providing communication between the chambers 49 and 52 which latter is the exhaust chamber and effects the discharge of all spent fluid from the upper end of said cylinder 6 through the pipes 51 and 50.

It will be apparent from the foregoing that the controlling valve 18 when operated by the hand lever 27 to open position may be held in such a position as long as it is desired to retain the pivot valve 1 open, but upon the release of said handle the valve 18 and associated parts will by their own weight return to normal or valve closed position provided the solenoid 28 is not, at this time, energized. If, on the other hand, said solenoid is energized the valve 18 will be held thereby in its uppermost or valve open position until the circuit including said solenoid is broken.

Upon deenergization of said solenoid 28 the sleeve valve 18 will drop to the position shown in Fig. 2, opening the lower end of the cylinder through the pipe 48, chamber 46, ports 47, interior of sleeve valve 18, ports 53 and chamber 52 to the exhaust pipe 54, and at the same time connect the upper end of the cylinder 6 through the pipe 51, chamber 49, ports 50, annular passages 39, ports 44 and chamber 43 with the fluid supply pipe 45 whereby pressure of fluid will act upon the piston 7 to maintain the pivot valve closed.

The mechanism hereinbefore described is particularly though not essentially adapted for use in connection with valves for controlling the flow of water or fluid to electric generating plants, wherein it is desirable to shut off the supply of power to the generator operating device the instant the current from the generator is shut off, thus to avoid injury to said generator.

To illustrate such an arrangement I have shown in connection with Fig. 1 in diagram an electric circuit 56 which includes the coils of the solenoid 28, also a generator 58, switch 60 desirably located at a remote point relatively to the control valve 18, also a second switch 62 which may be located in close proximity to said controlling means.

The generator 58 is shown coupled with a turbine 64 or other power generating device located in a conduit 66, the supply of fluid whereof will be controlled by the pivot valve 1.

With the above arrangement it will be obvious that the opening of the valve 1 as hereinbefore described so as to supply fluid to the turbine 64 starts the generation of electricity in the circuit 56 and energizes the solenoid 28. As long as there is current in said circuit fluid will continue to flow to said generator, also, as long as the circuit 56 remains closed and fluid continues to flow through said conduit 66 to the turbine so as to generate current the pivot valve will remain open.

To close the valve 1, either the switch 60 or the switch 62 may be opened or should anything unforeseen happen to said circuit or any parts included therein which would result in interrupting said current supply the pivot valve will automatically close upon the deenergizing of said solenoid.

It is to be understood that the invention is not limited to the specific embodiment shown herein.

I claim:

In combination, a pivot valve, fluid operated means for opening and closing said pivot valve, a control valve for said fluid, manual means for operating said control valve from a proximate point, electrical means for operating said control valve from a remote point to maintain said control valve in a position to hold said valve open, weight means for returning said control valve to said closed position upon the deenergizing of said electrical means, and means for cushioning said control valve upon its return to normal position.

In testimony whereof, I have signed my name to this specification.

DONALD M. BELCHER.